United States Patent [19]

Juang

[11] Patent Number: 5,590,986
[45] Date of Patent: Jan. 7, 1997

[54] DRILL JIG FOR LOCATING HOLES TO BE DRILLED IN A WORKPIECE

[76] Inventor: Bor-Chang Juang, No. 3, Lane 14, Chen-Hsing Rd., Tai-Ping Hsiang, Taichung Hsien, Taiwan

[21] Appl. No.: 433,923

[22] Filed: May 2, 1995

[51] Int. Cl.$^6$ .................................................. B23B 49/00
[52] U.S. Cl. ........................................ 408/115 R; 408/97
[58] Field of Search ............................. 408/79, 97, 103, 408/115 R

[56] References Cited

U.S. PATENT DOCUMENTS

| | | | |
|---|---|---|---|
| 4,194,861 | 3/1980 | Keller | 408/115 R |
| 4,752,162 | 6/1988 | Groh | 408/115 R |
| 4,952,101 | 8/1990 | Coombs | 408/115 R |
| 5,054,969 | 10/1991 | Gibson et al. | 408/115 R |
| 5,308,199 | 5/1994 | Juang | 408/115 R |

*Primary Examiner*—Daniel W. Howell
*Attorney, Agent, or Firm*—Knobbe, Martens, Olson & Bear

[57] ABSTRACT

A drill jig for locating holes to be drilled in a workpiece includes an elongated guiding block, a guiding rod and a positioning block. A plurality of through-bores are formed in the guiding block and are longitudinally aligned. A bushing and a positioning pin extend removably through two of the through-bores. Each of the threaded holes is provided with a locking screw so that the bushing and the positioning pin can be releasably locked in the two through-bores by the corresponding locking screws. The guiding rod is connected to a side face of the guiding block and extends in a direction that is transverse to the longitudinal direction of the guiding block. The positioning block has an abutting plate depending from the bottom face of the positioning block, a threaded bore formed in the top face of the positioning block, and a through hole through which the guiding rod slidably passes. The through hole communicates with the threaded bore in a direction that is transverse to the axis of the threaded bore. A locking bolt is threaded into the threaded bore so that the positioning block can be locked releasably to the guiding rod.

3 Claims, 6 Drawing Sheets

DRILL JIG FOR LOCATING HOLES TO BE DRILLED IN A WORKPIECE

BACKGROUND OF THE INVENTION

1. Field of the Invention

This invention relates to a drill jig for locating holes to be drilled in a workpiece, and more particularly to a drill jig for locating in-line holes to be drilled in a workpiece.

2. Description of the Related Art

In the past, drilling has been widely used for processing workpieces. In some cases, rows of aligned holes are formed in a workpiece. For example, aligned holes are often formed in modular units of a DIY (do it yourself) furniture in order to combine the modular units by means of pins or tenons to form finished furniture. Referring to FIG. 1, DIY furnitures usually include two upright mounting plates 1. Each of the mounting plates 1 has two rows of aligned holes 2 in the inside face thereof. Each hole of one of the two rows of holes 2 is aligned with the corresponding one of the other row of holes 2, so that every four holes 2 are arranged at the same level when two mounting plates 1 are set up with two inside faces facing one another. Four tenons 3 may be inserted into four holes 2 at the same level in order to support a partition plate 4. Four additional tenons 3' can be inserted into four holes 2 at a lower level in order to support the partition plate 4 at a lower level. In this way, the level of the partition plate 4 with respect to the mounting plates 1 can be adjusted by inserting the tenons 3 or 3' into the holes 2 at different levels. To ensure the accuracy of the location of the holes 2 in the mounting plates 1, drill jigs are often used to facilitate the formation of the holes 2.

Referring to FIG. 2, a conventional drill jig is used to locate the holes 2 to be drilled in the mounting plate 1. The drill jig includes a pair of parallel shafts 10 and four limiting pieces 11 which are provided on the ends of the parallel shafts 10. The limiting pieces 11 clamp on two opposite edges of the mounting plate 1 in order to hold the parallel shafts 10 in position. A pair of elongated guide bars 12 are mounted slidably and transversely on the parallel shafts 10. The guide bars 12 are formed with a series of aligned and equally spaced through-bores 13. The drill jig further includes locking bolts 14 which lock the guide bars 12 on the parallel shafts 10.

A guide block 15 is mounted detachably and slidably to one of the guide bars 12. The top face of the guide block 15 has a bore in which a bushing 16 is received. When using the conventional drill jig, the guide bars 12 are initially adjusted to the desired positions on the mounting plate 1 and locked by means of the locking bolts 14. The guide block 15 is moved along the one of the guide bars 12 so as to align the bushing 16 with one of the through-bores 14. A drill bit (not shown) is then extended into the bushing 16 and is rotated in order to bore a hole 2.

After one hole 2 has been bored, the guide block 15 is moved so as to align with another one of the through-bores 13. The above procedure is then repeated to form another hole 2 in the mounting plate 1.

The drawbacks of the conventional drill jig are as follows:

1. The drill jig has so many components that the manufacturing costs for these components are high. Therefore, the drill jig is expensive.

2. The time for mounting the drill jig onto a workpiece is long and the operation procedures of the drill jig is complicated. If the sizes of the workpieces are different, frequent mounting and dismounting is unavoidable. This inconveniences the users and increase the overall working time.

SUMMARY OF THE INVENTION

It is therefore an object of this invention to provide a drill jig for locating holes to be drilled in a workpiece which can overcome the drawbacks commonly associated with the prior art.

More specifically, the object of this invention is to provide a drill jig which is simple in structure and is convenient in operation to locate holes to be drilled in a workpiece.

Accordingly, the drill jig for locating holes to be drilled in a workpiece comprises:

- an elongated guiding block having a top face which is formed with a plurality of through-bores for locating holes to be drilled in a workpiece, the through-bores being spaced apart and aligned in the longitudinal direction of the guiding block, a plurality of threaded holes, each of which communicates with one of the through-bores in a direction which is transverse to axes of the through-bores, a bushing and a positioning pin extending removably through two of the through-bores, each of the threaded holes having a locking screw so that the bushing and the positioning pin can be releasably locked in the two of the through-bores by said locking screws when said bushing and said positioning pin are received in the two through-bores;
- a guiding rod connected to a side face of the guiding block and extending in a direction that is transverse to the longitudinal direction of the guiding block; and
- a positioning block having a bottom face, an abutting plate depending from the bottom face of the positioning block, a top face which is formed with a threaded bore, a through hole through which the guiding rod slidably passes, the through hole communicating with the threaded bore in a direction that is transverse to the axis of the threaded bore, and a locking bolt being threaded into the threaded bore so that the positioning block can be locked releasably to the guiding rod.

In a preferred embodiment of the present invention, the bottom face of the guiding block is formed with a longitudinal groove running the length of the guiding block. The longitudinal groove communicates with the through-bores of the guiding block and permits the cuttings to escape therefrom.

Preferably, the positioning pin is formed with sections of different diameters so as to be extended into drilled holes of different diameters.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
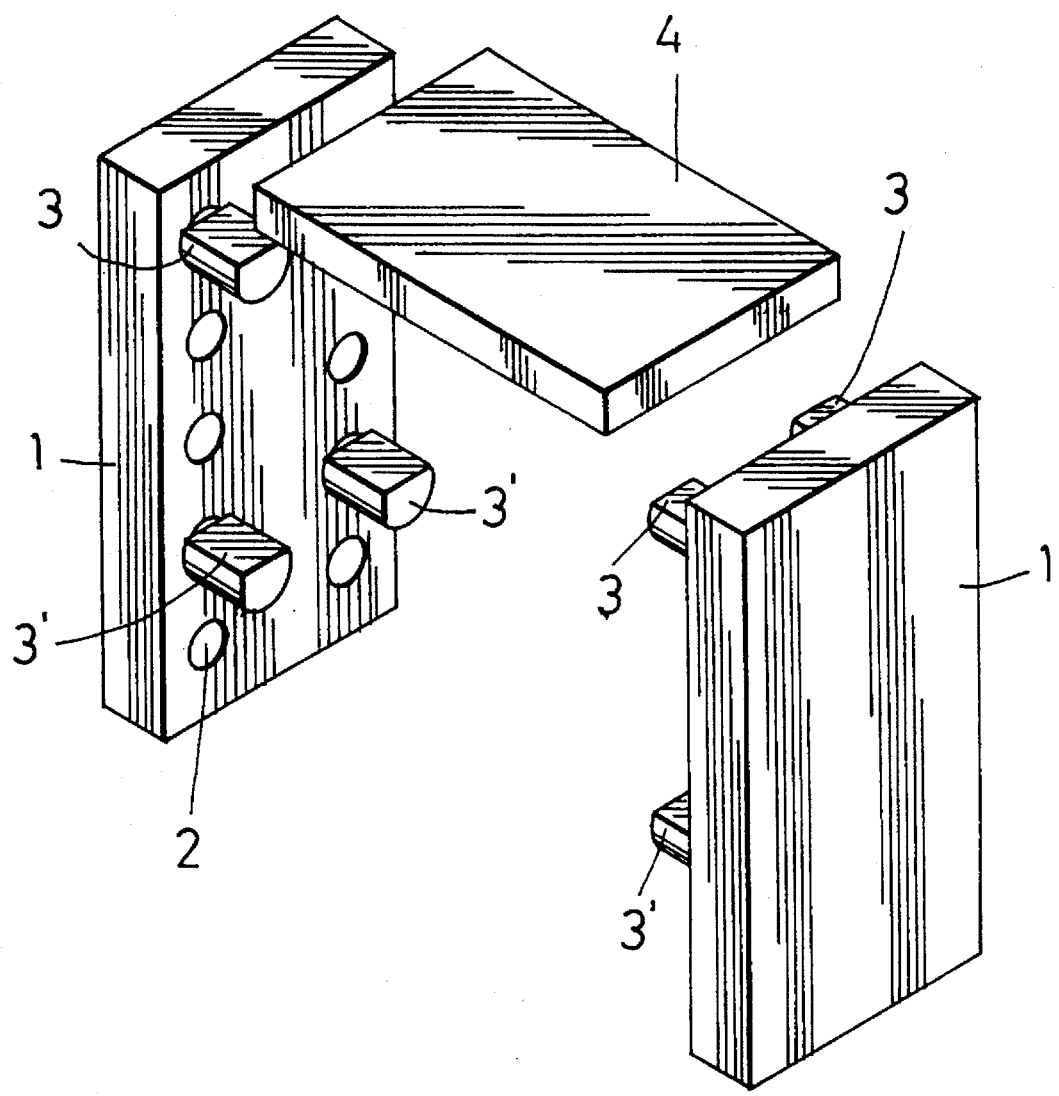
FIG. 1 is an exploded perspective view, illustrating the assembly of modular units of an item of DIY furniture, in which each of the upright mounting plates is provided with two rows of aligned holes.
Figure 2:
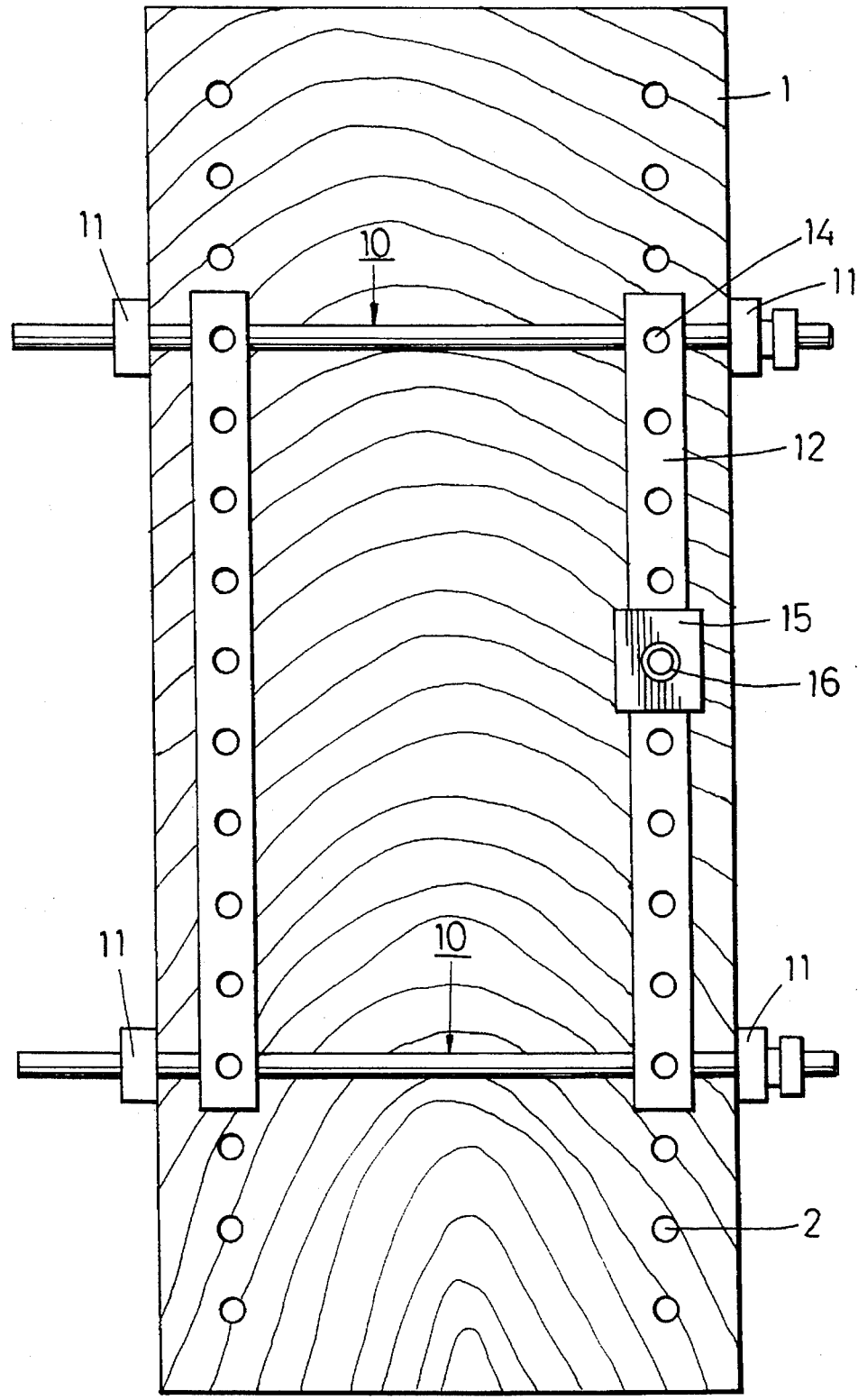
FIG. 2 is a top view illustrating the operation of a conventional drill jig used to locate holes to be drilled in a mounting plate.

Before the present invention is described in greater detail, it should be noted that like elements are denoted by the same reference numerals throughout the disclosure.

Figure 3:
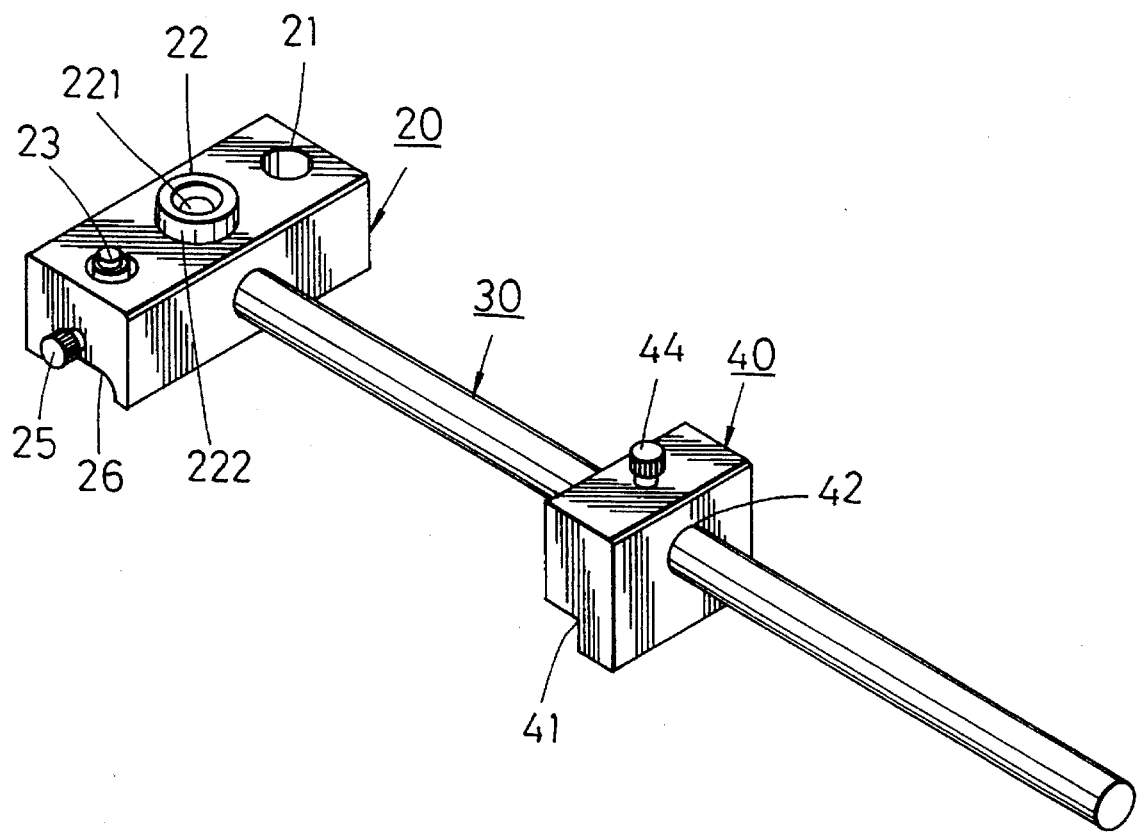
FIG. 3 is a perspective view of a first preferred embodiment of a drill jig for locating holes to be drilled in a workpiece according to the present invention.

Referring to FIG. 3, the first preferred embodiment of a drill jig for locating holes to be drilled in a workpiece is shown to comprise an elongated guiding block 20, a guiding rod 30 and a positioning block 40.

Figure 4:
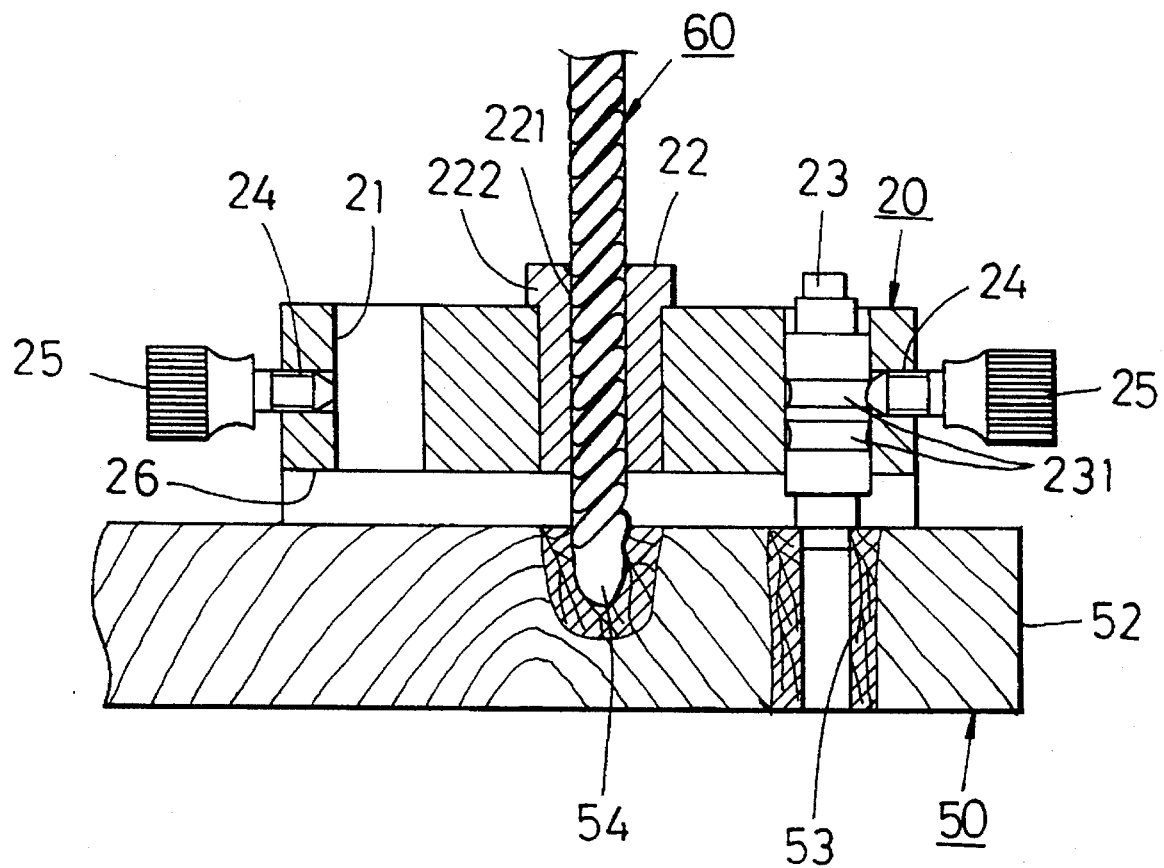
FIG. 4 is a sectional schematic view illustrating the first preferred embodiment when in use.

The guiding block 20 is a rectangular block which has a top face that is formed with three through-bores 21. The through-bores 21 are spaced apart and aligned in a longitudinal direction of the guiding block 20. A bushing 22 and a positioning pin 23 extend removably through two of the through-bores 21. As shown in FIG. 4, the bushing 22 is a standardized part and has a central through hole 221. The upper end of the through hole 221 is chamfered so as to guide the feed direction of a drill bit. The bushing 22 is selected so that its diameter corresponds to the holes to be drilled in a workpiece. The upper end of the bushing 22 has a radial flange 222 which may rest on the top face of the guiding block 20 when the bushing 22 is mounted in the through-bore 21 in order to prevent the bushing 22 from dropping out of said through-bore 21.

Figure 5:
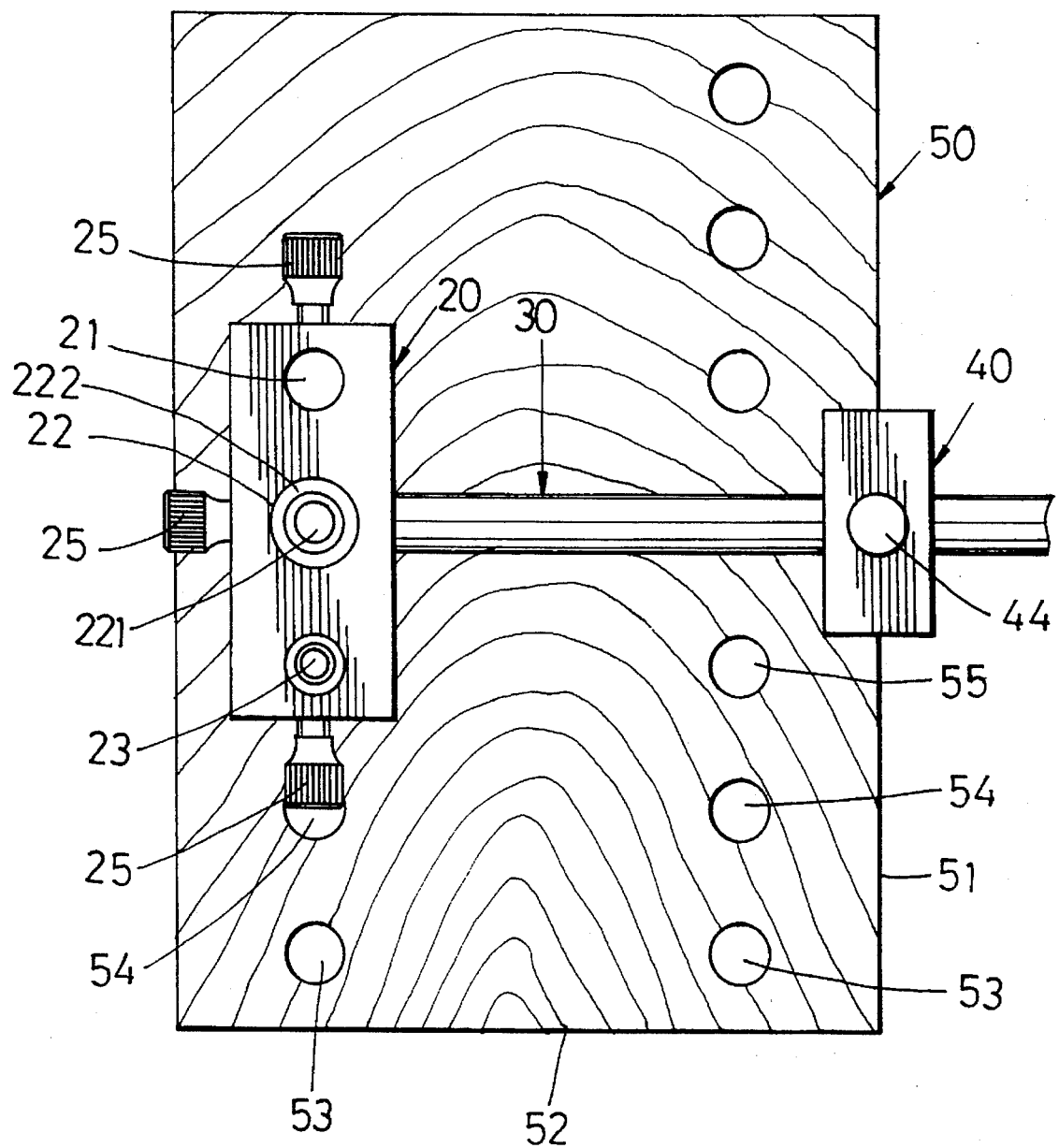
FIG. 5 is a top view illustrating the first preferred embodiment when in use.

In this embodiment, the positioning pin 23 has two end portions which are formed with six sections of different diameter, and a middle portion which is formed with two annular grooves 231. The guiding block 20 further has three threaded holes 24 which communicate with the three through-bores 21. Three locking screws 25 are threaded into the threaded holes 24 in order to lock releasably the bushing 22 and the positioning pin 23 in the through-bores 21, as shown in FIGS. 4 and 5. When being threaded into the through-bore 21 through the threaded hole 24, the tip of said one of the locking screws 25 can extend into one of the annular grooves 231 of the positioning pin 23 to prevent the positioning pin 23 from disengaging from the guiding block 20. The bottom face of the guiding block 20 has a longitudinal groove 26 which runs the length of the guiding block 20 and which communicates with the through-bores 21 of the guiding block 20.

The guiding rod 30 is connected to a side face of the guiding block 20 and extends in a direction that is transverse to the longitudinal direction of the guiding block 20.

The positioning block 40 is generally a rectangular block which has a bottom face from which an abutting plate 41 depends. The top face of the positioning block 40 is formed with a threaded bore 43. The positioning block 40 further has a through hole 42 through which the guiding rod slidably passes. The through hole 42 communicates with the threaded bore 43 in a direction that is transverse to the axis of the threaded bore 43. A locking bolt 44 is threaded into the threaded bore 43 so that the positioning block 40 can be locked releasably to the guiding rod 30.

The following is a detailed description of the operation of the first preferred embodiment of the drill jig of the present invention:

Referring to FIG. 4, the first preferred embodiment is used to locating holes to be drilled in a rectangular wooden workpiece 50. The positioning block 40 is initially placed on the top face of the workpiece 50 with the abutting plate 41 abutting tightly against a reference edge 51 of the workpiece 50. The guiding block 20 is moved to a predetermined position on the workpiece 50 to provide a given distance between the reference edge 51 and the guiding block 20. The locking bolt 44 is then tightened to secure the positioning block 40 on the guiding rod 30 in order to fix said given distance. The positioning pin 23 extends through one of the through holes 21 and abuts against the bottom edge 52 of the workpiece 50 which is adjacent and transverse to the reference edge 51. The bushing 22 is then locked in the other one of the through-bores 21 by means of the locking screw 25. A drill bit 60 of a predetermined diameter passes through the bushing 22 and is rotated to bore a first hole 53 in the workpiece 50. The cuttings produced during the boring of the workpiece 50 can escape via the longitudinal groove 26.

Referring to FIG. 5, one of the six sections of the positioning pin 23, which has a diameter that conforms with that of the first hole 53, is press-fitted into the first hole 53 so that the positioning pin 23 can be positioned in the first hole 53. The positioning pin 23 is locked in the through-bore 21 by means of the locking screw 25. Since the through holes 21 are parallel to the reference edge 51, the distance between the through hole 221 of the bushing 22 and the reference edge 51 is the same as that of between the first hole 53 and the reference edge 51. A drill bit 60 can extend into the through-bore 221 of the bushing 22 and rotate to bore a second hole 54 which is spaced from the first hole 53 at a distance that is equal to the distance between two through holes 21 of the guiding block 20. After the formation of the second hole 54, the drill jig of the first preferred embodiment is lifted up in order to detach the positioning pin 23 from the first hole 51 of the workpiece 50. To bore a third hole 55 in the workpiece 50, the drill jig is placed on the workpiece 50 with the positioning pin 23 press-fitted in the second hole 54. The operation steps are repeated to form one row of aligned holes in the workpiece 50. The guiding block 20 may be moved to the other side of the workpiece by releasing the locking bolt 44. Similarly, a second row of aligned holes may be formed in the workpiece by locking the guiding block 20 to a position adjacent to the opposed edge of the reference edge 51 with the abutting plate 41 abutting against the reference edge 51 and repeating the above mentioned steps.

Note that the drill jig of the present invention may be easily operated and adjusted to locate holes to be drilled in a workpiece. In addition, because the operation steps are simple, the processing time is reduced and the manufacturing speed is increased. Furthermore, because the structure of the drill jig is relatively simple, the costs of manufacturing the drill jig are low.

The distance between the holes to be drilled in the workpiece 50 can be varied by changing the relative positions of the bushing 22 and the positioning pin 23. For example, the distance between the holes to be drilled in the workpiece 50 can be increased by inserting the bushing 22 and the positioning pin 23 in the through-bores 21 which are located near the ends of the guiding block 20. Thereby, the distance between two holes in the workpiece 50 will be twice of the distance between the two holes 53 and 54 of the first embodiment.

Since the positioning pin 23 has sections which are different in diameter, the positioning pin 23 can be positioned in holes which are formed by different drill bits of different diameter in order to position the guiding block 20. Therefore, the application range of the positioning pin 23 is broad.

Figure 6:
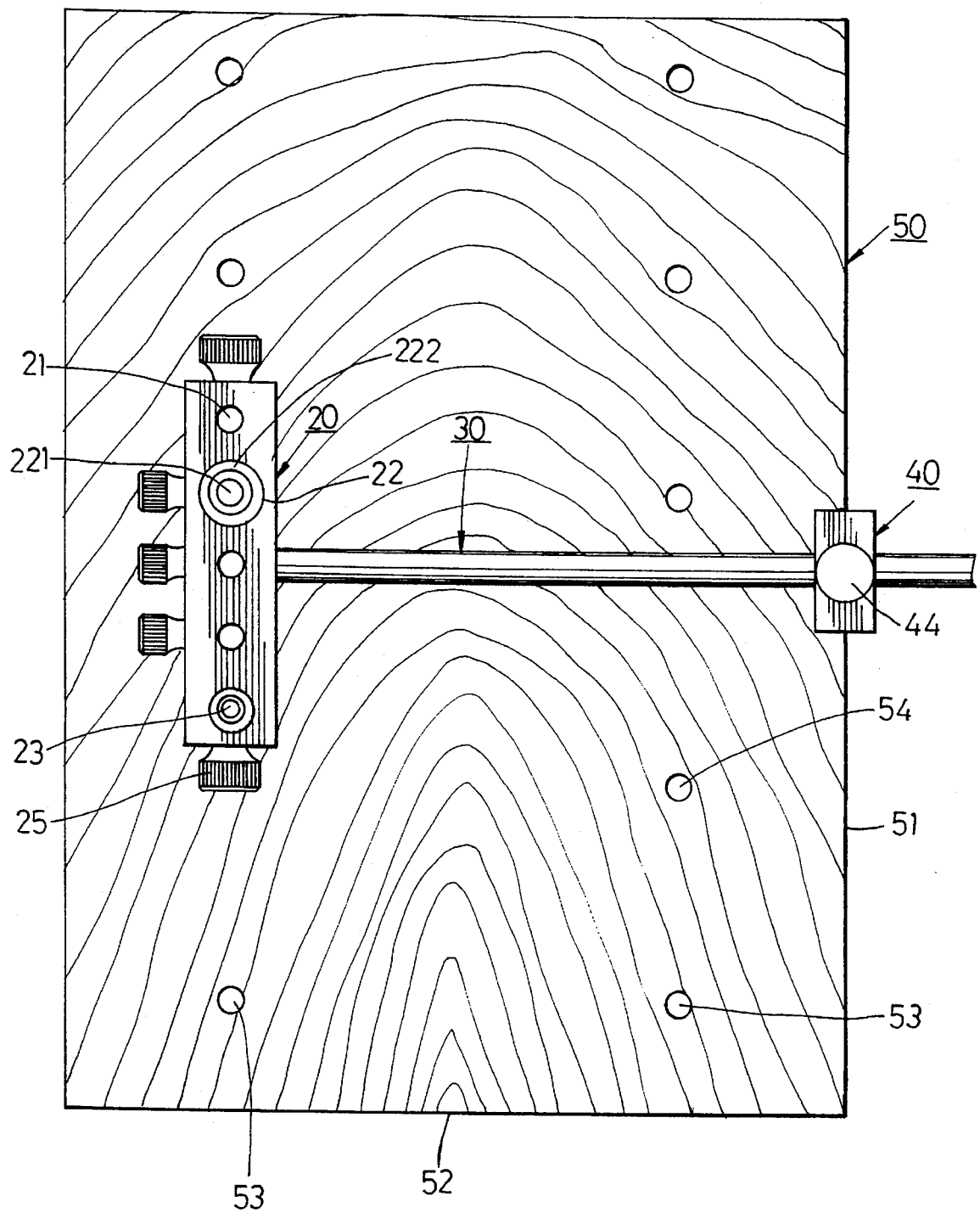
FIG. 6 is a top view illustrating the second preferred embodiment of the drill jig when in use.

FIG. 6 illustrates the second preferred embodiment of the drill jig according to the present invention. In this embodiment, the guiding block 20 is longer than that of the first preferred embodiment. There are five through-bores 21 formed in the guiding block 20. Of course, without adversely affecting the drilling operation, the length of the guiding block 20 or the number of the through-bores 21 can be further increased. In this condition, the bushing 22 and the positioning pin 23 can have more positions. That is, the positioning pin 23 can be positioned in one of the through-bores 21 and the bushing 22 can be received in one of the other four through-bores 21. Therefore, the distance between the holes in the workpiece 50 can be larger than of the holes of the first preferred embodiment.

With this invention thus explained, it is apparent that numerous modifications and variations can be made without departing from the scope and spirit of this invention. It is therefore intended that this invention be limited only as indicated in the appended claims.

I claim:

1. A drill jig for locating holes to be drilled in a workpiece, comprising:

an elongated guiding block having a top face which is formed with a plurality of through-bores for locating holes to be drilled in a workpiece, said through-bores being spaced apart and aligned in a longitudinal direction of said guiding block, a plurality of threaded holes, each of which communicates with a respective one of said through-bores in a direction that is transverse to axes of said through-bores, a bushing and a positioning pin extending removably through two of said through-bores, each of said threaded holes having a locking screw so that said bushing and said positioning pin can be releasably locked in said two through-bores by the corresponding locking screws when they are received in said two through-bores;

a guiding rod connected to a side face of said guiding block and extending in a direction that is transverse to said longitudinal direction of said guiding block; and a positioning block having a bottom face, an abutting plate depending from said bottom face of said positioning block, a top face which is formed with a threaded bore, a through hole through which said guiding rod slidably passes, said through hole communicating with said threaded bore in a direction that is transverse to an axis of said threaded bore, a locking bolt being threaded into said threaded bore so that said positioning block can be locked releasably to said guiding rod.

2. A drill jig as claimed in claim 1, wherein said guiding block has a bottom face which is formed with a longitudinal groove running the length of said guiding block, said longitudinal groove communicating with said through-bores of said guiding block.

3. A drill jig as claimed in claim 1, wherein said positioning pin has two end portions and a middle portion located between said two end portions, said middle portion having two annular grooves formed therearound, said two end portions being formed with six sections that differ in diameter.

* * * * *

UNITED STATES PATENT AND TRADEMARK OFFICE
CERTIFICATE OF CORRECTION

PATENT NO. : 5,590,986
DATED : January 7, 1997
INVENTOR(S) : Bor Chang-Juang

It is certified that error appears in the above-indentified patent and that said Letters Patent is hereby corrected as shown below:

Title page, item [76], inventor: change "Bor-chang Juang"to --Bor Chang-Juang--.

Signed and Sealed this

Twenty-third Day of September, 1997

Attest:

BRUCE LEHMAN

Attesting Officer

Commissioner of Patents and Trademarks